United States Patent
Terada

(10) Patent No.: US 7,151,993 B2
(45) Date of Patent: Dec. 19, 2006

(54) VEHICLE CRUISE CONTROL SYSTEM FOR SWITCHING VEHICLE CRUISE CONTROL STATE USING WINDSHIELD WIPER OPERATION

(75) Inventor: Syoji Terada, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 127 days.

(21) Appl. No.: 11/010,433

(22) Filed: Dec. 14, 2004

(65) Prior Publication Data

US 2005/0165533 A1    Jul. 28, 2005

(30) Foreign Application Priority Data

Jan. 27, 2004   (JP)   ............... 2004-018480

(51) Int. Cl.
*B60T 8/58*   (2006.01)
(52) U.S. Cl. ............... 701/93; 180/179; 123/352
(58) Field of Classification Search ............... 701/93, 701/96, 70, 94, 95, 97, 99, 300, 301, 101, 701/102, 110, 36, 51, 53, 54, 82, 84, 86; 180/179, 169, 176, 177; 340/902, 903, 904, 340/435, 436, 439; 123/350, 351, 352, 361; 342/450, 455, 61, 70, 72

See application file for complete search history.

(56) References Cited

U.S. PATENT DOCUMENTS 5,594,645 A * 1/1997 Nishimura et al. ........... 701/96
6,044,321 A * 3/2000 Nakamura et al. ........... 701/96
6,311,120 B1  10/2001 Asada
6,414,623 B1 * 7/2002 Ashihara ................ 342/70
6,560,525 B1 * 5/2003 Joyce et al. ............... 701/96

FOREIGN PATENT DOCUMENTS

| JP | 10-81156 A    |   | 3/1998  |
| JP | 10081156 A    | * | 3/1998  |
| JP | 11034693 A    |   | 2/1999  |
| JP | 2000-309257 A |   | 11/2000 |
| JP | 2005-212512 A |   | 8/2005  |

* cited by examiner

*Primary Examiner*—Thomas G. Black
*Assistant Examiner*—Santanu Chatterjee
(74) *Attorney, Agent, or Firm*—Shinjyu Global IP Counselors

(57) ABSTRACT

A cruise control system is configured to cancel/prohibit cruise control depending on the operating state of the wipers. When the wipers are in a continuous operation mode and low speed following cruise control is in progress, execution of the low speed following cruise control is continued. When the wipers are in a continuous operation mode and high speed following cruise control is in progress, execution of the high speed following cruise control is continued if the vehicle speed is in the vehicle speed overlap region or if a preceding vehicle is detected (i.e., even if the vehicle speed is not in the vehicle speed overlap region). When the wipers are in a continuous operation mode and high speed following cruise control is in progress, the high speed following cruise control is canceled if the vehicle speed exceeds the vehicle speed overlap region and a preceding vehicle is not detected.

11 Claims, 2 Drawing Sheets

VEHICLE CRUISE CONTROL SYSTEM FOR SWITCHING VEHICLE CRUISE CONTROL STATE USING WINDSHIELD WIPER OPERATION

CROSS-REFERENCE TO RELATED APPLICATIONS

This application claims priority to Japanese Patent Application No. 2004-018480. The entire disclosure of Japanese Patent Application No. 2004-018480 is hereby incorporated herein by reference.

BACKGROUND OF THE INVENTION

1. Field of the Invention

The present invention generally relates to a vehicle cruise control system. More specifically, the present invention relates to a vehicle cruise control system that is configured to execute cruise control in such a manner that the vehicle equipped with the cruise control system travels in a target traveling state, e.g., such a state as following a preceding vehicle or traveling at a constant speed.

2. Background Information

Over the years many different cruise control systems have been proposed for executing such cruise control states as following a preceding vehicle at a prescribed following distance and traveling at a constant speed based on a preset vehicle speed.

Some of these cruise control systems are provided with a following distance detecting sensor, such as a laser radar, that serves to determine if a preceding vehicle or an obstacle exists and detect the distance to the preceding vehicle or obstacle from the vehicle in which the cruise control system is installed. Such cruise control systems then execute the cruise control based on the detection results of the following distance detecting device.

When cruise control is executed based on the detection results of a following distance detecting device, there are times when the accuracy of the following distance detecting device declines due to rain, snow, or the like. In order to avoid executing cruise control based on a detection signal from a following distance detecting device whose accuracy could possibly have declined, such cruise control systems are configured to estimate the degree of rain or snow based on the operating state of the wipers and abort the cruise control or take other precautionary measures when the estimation results indicate a degree of rain or snow that could compromise the accuracy of the following distance detecting device.

For example, consider a case in which the wipers are provided with the following operating modes: a high-speed continuous mode in which the wipers are moved at a high speed in a continuous manner; a low-speed continuous mode in which the wipers are moved at a low speed in a continuous manner; and an intermittent mode in which the wipers are moved intermittently. In such a case, the cruise control system can be configured such that when the wipers are operating in the high-speed continuous mode or the low-speed continuous mode, the system estimates that the quantity of rainfall or snowfall is comparatively large and that the accuracy of the following distance detecting device could be low. The system can also be configured to determine that the quantity of rainfall or snowfall is comparatively large when the wipers are operating in the intermittent mode with a short time interval setting. Thus, when control of the vehicle speed by the cruise control system is in progress, the cruise control is aborted if it is detected that the wipers are operating in high-speed continuous mode, low-speed continuous mode, or intermittent mode with a comparatively short time interval setting.

One example of such a cruise control system is disclosed in Japanese Laid-Open Patent Publication No. 10-081156

In view of the above, it will be apparent to those skilled in the art from this disclosure that there exists a need for an improved vehicle cruise control system. This invention addresses this need in the art as well as other needs, which will become apparent to those skilled in the art from this disclosure.

SUMMARY OF THE INVENTION

It has been discovered that it is an effective approach to abort the cruise control as described above when the wipers are operated in a high-speed continuous mode or a low-speed continuous mode because the accuracy of the following distance detecting device could have declined if the quantity of rainfall or snowfall is comparatively large. However, when, for example, the host vehicle is traveling at a relatively low speed and a low-speed following cruise control is being executed by the vehicle, then the rainfall or snowfall, e.g., splashing, has little affect on the cruise control to operate properly. Therefore, the following distance detecting device can provide sufficient accuracy even if the wipers are operating in a continuous mode.

However, since conventional cruise control systems like that described above are configured to cancel the cruise control when an estimate of the accuracy of the following distance detecting device based on the wiper operating mode indicates that the cruise control should be canceled, then there are times when the cruise control system cancels the cruise control even though the vehicle is traveling in a relatively low speed region and the following distance detecting device can provide sufficient accuracy without being significantly affected by splashing. In short, there are times when such systems cancel the cruise control unnecessarily.

The present invention was conceived with this unresolved issue of the prior art in mind. One object of the present invention is to provide a vehicle cruise control system that can execute cruise control in an efficient manner based on the manner in which the accuracy of the following distance detecting device is affected by the weather such as the rain and the like.

In order to achieve the aforementioned object, a vehicle cruise control system in accordance with the present invention is provided that comprises a preceding object detecting section, a cruise control section, a wiper operation detecting section and a cruise control prohibiting section. The preceding object detecting section is configured to detect an object existing in front of a host vehicle equipped with the cruise control system, and to detect a relative positional relationship between the object and the host vehicle. The cruise control section is configured to control vehicle speed of the host vehicle to a target traveling state based on the relative positional relationship detected by the preceding object detecting device. The wiper operation detecting section is configured to detect a vehicle wiper operating state of the host vehicle. The cruise control prohibiting section is configured to prohibit cruise control by the cruise control section depending on the vehicle wiper operating state detected by the wiper operation detecting section and the target traveling state set by the cruise control section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
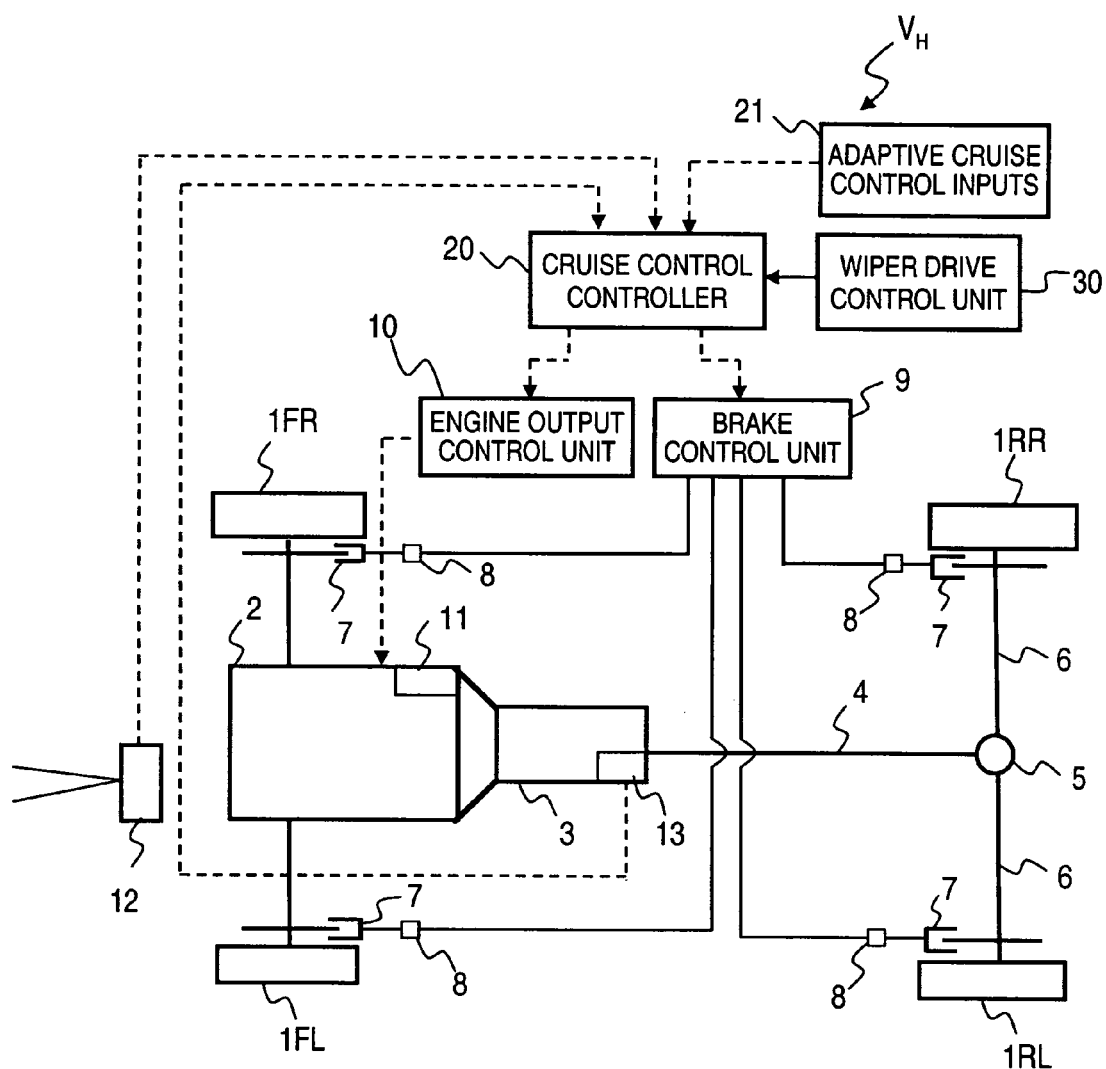
FIG. 1 is a schematic structural diagram of a vehicle equipped with a cruise control system in accordance with one embodiment of the present invention.

Referring initially to FIG. 1, a host vehicle $V_H$ is illustrated equipped with a vehicle cruise control system in accordance with one embodiment of the present invention. Basically, the vehicle cruise control system in accordance with the present invention is configured to generally prohibit cruise control when a detected wiper operating mode is a mode that has been preset as a mode that requires cruise control to be prohibited and the vehicle speed is larger than a preset threshold value. However, cruise control is not prohibited when the vehicle speed is below the threshold value. In short, since the cruise control system determines if the accuracy of the preceding object detecting device is in a declined state, i.e., determines if cruise control should be prohibited, based on both the wiper operating mode (which indicates if it is raining or snowing) and the vehicle speed, unnecessary prohibition of the cruise control is avoided and the cruise control prohibition control is conducted in a manner that is more in line with the actual traveling conditions of the vehicle.

This host vehicle $V_H$ includes, among other things, a pair of non-driven front wheels 1FL and 1FR, a pair of drive rear wheels 1RL and 1RR, an engine 2, an automatic transmission 3, a propeller shaft 4, a final reduction gear 5, a wheel axle 6 and a plurality of disc brakes 7. The engine 1 is a conventional internal combustion engine that acts as a main drive source, which transmits a drive force to the drive rear wheels 1RL and 1RR through the automatic transmission 3, the propeller shaft 4, and the final reduction gear 5 in a conventional manner.

The wheels 1FL, 1FR, 1RL and 1RR are each fitted with one of the disc brakes 7. The wheels 1FL, 1FR, 1RL and 1RR are each provided with a brake actuator 8 for generating a braking force and the brake fluid pressure of the brake actuators 7. The brake actuators 8 are controlled by a brake control unit 9. The brake control unit 9 is configured to generate brake fluid pressure in response to the depression of a brake pedal (not shown) and to generate and deliver to the brake actuators 8 a brake fluid pressure corresponding to the size of a brake fluid pressure command from the cruise control controller 20.

The engine 2 is provided with an engine output control unit 10 for controlling the output thereof. The engine 2 is operatively coupled to the engine output control unit 10. The engine output control unit 10 controls the torque and speed of the engine 2 by controlling the throttle valve opening, fuel injection, ignition timing, and so forth of the engine 1 according to a throttle valve opening command value θ* from the driving controller 14. Thus, the engine output control unit 10 is configured to control a throttle actuator 11 that is arranged and configured to regulate the opening of a throttle valve (not shown) provided on the engine 2. The engine output control unit 10 executes its control in response to the accelerator depression amount and a throttle opening command value from a cruise control controller 20.

A vehicle speed sensor 13 is arranged and configured to detect the vehicle speed based on the rotational speed of the output side of the automatic transmission 3.

An inter-vehicle distance sensor 12 is configured and arranged to detect the inter-vehicle or following distance between the host vehicle $V_H$ and a preceding vehicle in the same lane as the host vehicle $V_H$. The inter-vehicle distance sensor 12 is preferably provided on the lower part of the vehicle body at the front of the host vehicle $V_H$. The inter-vehicle distance sensor 12 is, for example, a radar device that detects the existence of a preceding vehicle and the distance between the host vehicle $V_H$ in which the cruise control system is installed and the preceding vehicle. This inter-vehicle distance sensor 12 functions by emitting a sweeping laser beam in front of the vehicle, for example, and picking up the light reflected back from a preceding vehicle. The inter-vehicle distance sensor 12 then measures the inter-vehicle distance or following distance between the host vehicle $V_H$ and the preceding vehicle. A scanning or multibeam type of a laser radar device, a milliwave device, or the like can be used for the inter-vehicle distance sensor 12. Also a distance sensor configured to use radio waves or ultrasonic waves can also be used.

The steering wheel (not shown) is provided with switches (adaptive cruise control inputs 21) for such tasks as starting up cruise control, setting the vehicle speed setting Vs to be used during high-speed following cruise control, and setting the following distance. During high-speed travel, the cruise control controller 20 executes high-speed following cruise control in which the traveling speed of the vehicle is controlled such that a target positional relationship is achieved with respect to the preceding vehicle while using a preset vehicle speed setting Vs as the maximum allowable speed when preceding vehicle exists and controlling the traveling speed of the vehicle such that the vehicle travels at the vehicle speed setting Vs when a preceding vehicle does not exist.

During low-speed travel, the cruise control controller 20 executes low-speed following cruise control in which the speed of the vehicle is controlled such that a prescribed following distance is maintained with respect to the preceding vehicle. The cruise control controller 20 executes high-speed following cruise control and low-speed following cruise control in accordance with the switches and input signals received from the inter-vehicle distance sensor 12 and the vehicle speed sensor 13.

Figure 2:
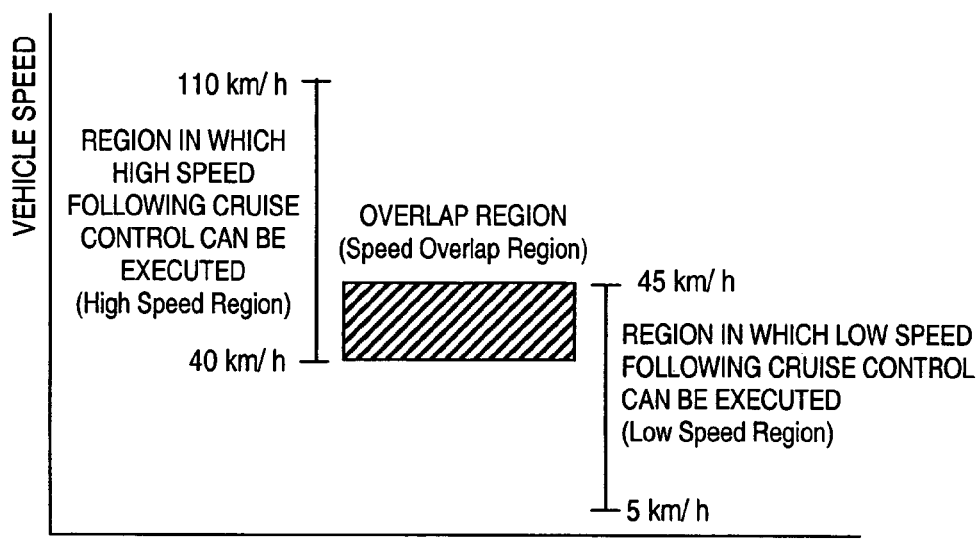
FIG. 2 is a graph illustrating the vehicle speed regions or ranges and illustrating which of the cruise control modes (e.g., high-speed following cruise control, low-speed following cruise control, or both) can be executed in each of the vehicle speed regions or ranges.

FIG. 2 shows the vehicle speed regions where high-speed following cruise control and low-speed following cruise control can be executed. As shown in FIG. 2, high-speed following cruise control can be executed when the vehicle speed is in a comparatively high vehicle speed region (e.g., 40 to 110 km/h, hereinafter called "high speed region") and low-speed following cruise control can be executed when the vehicle speed is in a comparatively low vehicle speed region (e.g., 5 to 45 km/h, hereinafter called "low speed region"). In the vehicle speed overlap region (40 to 45 km/h) where the high speed region and the low speed region overlap, both high-speed following cruise control and low-speed following cruise control can be executed.

The cruise control controller 20 receives wiper information indicating the operating mode of the wipers from the wiper drive control unit 30 and aborts or prohibits the use of the cruise control depending on the wiper operating mode of the wiper drive control unit 30. The wiper drive control unit 30 is configured to move the wipers in one of the following modes depending on the mode instruction from a mode switch (not shown): high speed mode, low speed mode, and intermittent mode. In high speed mode the wipers are moved at a comparatively high speed in a continuous manner, and in low speed mode the wipers are moved at a comparatively low speed in a continuous manner. In intermittent mode, the wipers are moved intermittently at a prescribed time interval.

Based on the wiper operating mode information received from the wiper drive control unit 30, the cruise control controller 20 executes cruise control normally when the wiper operating mode is set to the intermittent mode during execution of high-speed following cruise control or low-speed following cruise control. When the wiper operating mode is set to high speed mode or low speed mode, the cruise control controller 20 determines if cruise control of the vehicle can be continued based on the current conditions under which cruise control is being executed. If the cruise control controller 20 determines that cruise control cannot be continued under the current conditions, then the cruise control controller 20 aborts the cruise control.

Figure 3:
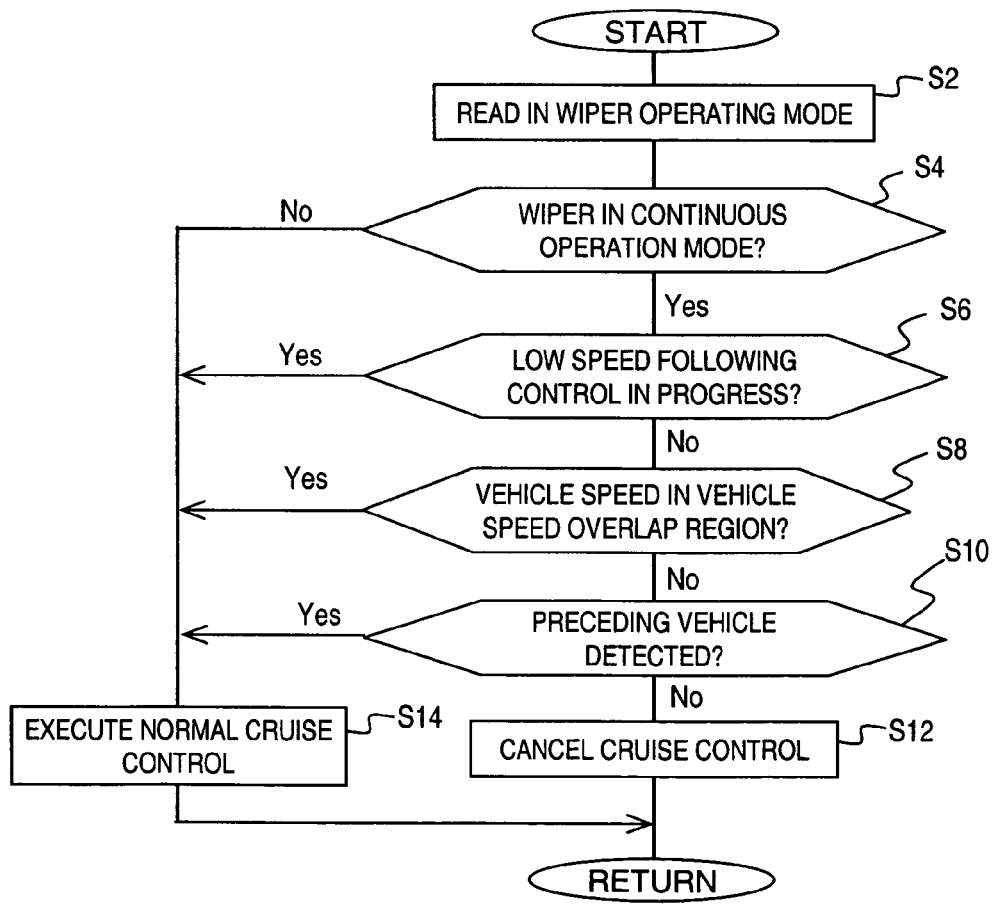
FIG. 3 is a flowchart illustrating an example of the processing steps executed by the cruise control controller in accordance with one embodiment of the present invention.

FIG. 3 shows an example of the processing steps executed by the cruise control controller 20. The processing shown in FIG. 3 is executed, for example, according to a prescribed preset cycle time.

In step S2, the cruise control controller 20 reads in the wiper operating mode information from the wiper drive control unit 30. In step S4, the cruise control controller 20 determines if the wipers are operating and are operating in either high speed mode or low speed mode, i.e., if the wipers are operating in a continuous operating mode. If the wipers are not operating in a continuous operating mode, the cruise control unit proceeds to step S14 and executes cruise control in the normal fashion in accordance with the cruise control switch settings. In other words, if the wipers are not operating at all or are operating in the intermittent mode, which indicates that the amount of rainfall or snowfall is small and the inter-vehicle distance sensor 12 can be expected to function with sufficient accuracy, then the cruise control controller 20 executes high-speed following cruise control or low-speed following cruise control in the normal fashion using the information detected by the inter-vehicle distance sensor 12.

Meanwhile, if in step S4 the wipers are found to be operating in a continuous mode, i.e., if the wipers operating mode indicates that the amount of rainfall or snowfall is large, then the cruise control controller 20 proceeds to step S6, where the cruise control controller 20 determines if the currently executed cruise control is high-speed following cruise control or low-speed cruise control. If low-speed cruise control is being executed, then the cruise control controller 20 proceeds to step S14 and executes the cruise control in the normal fashion. That is, when the vehicle is traveling in a comparatively low vehicle speed region (e.g., 5 to 45 km/h as shown in FIG. 2), low-speed following cruise control can be executed because the following distance is comparatively short and it is more difficult for splashing to occur. Consequently, even though it is raining or snowing, the inter-vehicle distance sensor 12 can be expected to function with sufficient accuracy and the cruise control controller 20 executes low-speed following cruise control in the normal fashion using the information detected by the inter-vehicle distance sensor 12.

Meanwhile, if in step S6 it is found that high-speed following cruise control is being executed, then the cruise control controller 20 proceeds to step S8 and determines if the vehicle speed is in the vehicle speed overlap region where both high-speed following cruise control and low-speed following cruise control can be executed. If the vehicle speed is in the overlap region, then the cruise control controller 20 proceeds to step S14 and executes cruise control normally. That is, even though high-speed following cruise control is being executed, the vehicle speed is in the overlap region, which is included in the low speed region. Consequently, the inter-vehicle distance sensor 12 can be expected to function with sufficient accuracy and the cruise control controller 20 continues to execute high-speed following cruise control.

Meanwhile, if the vehicle speed is found not to be in the overlap region in step S8, i.e., if the vehicle is traveling at a speed that exceeds the overlap region and high-speed following cruise control is in progress, then the cruise control controller 20 proceeds to step S10 where the cruise control controller 20 determines if a preceding vehicle is detected, i.e., if the vehicle is traveling while following another vehicle. If a preceding vehicle is detected, then the cruise control controller 20 proceeds to step S14 and executes cruise control in the normal fashion. If a preceding vehicle is not detected, then the cruise control controller 20 proceeds to step S12 and aborts the high-speed following cruise control.

In short, even if high-speed following control is in progress and the vehicle is traveling at a comparatively high speed, there are times when little splashing occurs (because the road drainage is good or for some other reason) and the preceding vehicle can be detected. If the preceding vehicle can be detected, it can be assumed that the inter-vehicle distance sensor 12 is able to function with sufficient accuracy without being affected by the rain and/or snow and the high-speed following cruise control is continued without interruption. Conversely, if the high-speed following cruise control is in progress but a preceding vehicle is not detected, then it can be assumed that either a preceding vehicle does not exist or the inter-vehicle distance sensor 12 is unable to detect the existence of the preceding vehicle because its accuracy has declined. Therefore, the high-speed following cruise control is aborted.

Thus, this embodiment is configured such that even if the wipers are operating in a continuous fashion in a high speed mode or a low speed mode, the cruise control is continued when low-speed following cruise control is being executed because the rain or snow has little effect on the performance of the cruise control system when the vehicle is traveling comparatively slowly. As a result, the range of operating conditions under which cruise control can be executed is expanded and the convenience of the cruise control system is improved. Furthermore, even though it can generally be expected that the accuracy of the inter-vehicle distance sensor 12 has declined when the wipers are operating in high speed mode or low speed mode, continuing the cruise control in the normal fashion when the wipers are operating in a continuous manner does not present a problem if the vehicle is traveling at a comparatively low speed and low-speed following cruise control is in progress because the actual effect of the rain or snow is not very large. Additionally, since the system is configured to abort the cruise control when the vehicle is following a preceding vehicle using low-speed following cruise control and it is found that the preceding vehicle is no longer detected, if the accuracy of the inter-vehicle distance sensor 12 should decline during low-speed following cruise control, the following cruise control will be canceled when the accuracy of the inter-vehicle distance sensor 12 declines to the point where preceding vehicle can no longer be detected. Consequently, even though low-speed following cruise control is continued under conditions where it can be expected that the amount of rainfall is comparatively large, unnecessary continuation of the cruise control based on less-than-accurate information detected by the inter-vehicle distance sensor 12 can be avoided.

This embodiment is configured such that high-speed cruise control can be executed even when wipers are operating in a continuous mode if the vehicle speed is in the overlap region, i.e., if the vehicle is traveling comparatively slowly such that the system is affected little by splashing. As a result, the range of operating conditions under which cruise control can be executed is expanded and the convenience of the cruise control system is improved. Additionally, the cruise control system of this embodiment is configured such that both high-speed following cruise control and low-speed following cruise control can be executed when the vehicle speed is in the overlap region, even if the wipers are operating in a continuous mode. Consequently, the cruise control system can switch between high-speed following cruise control and low-speed following cruise control while the vehicle is traveling in the overlap region without the cruise control being aborted immediately after the switch. Thus, situations in which the driver experiences an uncomfortable feeling resulting from the cruise control being abruptly aborted due to restrictions on cruise control in the vehicle speed overlap region are avoided.

This embodiment is configured such that high-speed cruise control can be executed even when the wipers are operating in a continuous mode and the vehicle speed exceeds the vehicle speed overlap region so long as a preceding vehicle can be detected, i.e., so long as the inter-vehicle distance sensor 12 can function with sufficient accuracy. As a result, the range of operating conditions under which cruise control can be executed is expanded and the convenience of the cruise control system is improved. Additionally, since the system is configured to cancel the cruise control when the vehicle is traveling at a speed that exceeds the vehicle speed overdrive region but no preceding vehicle is detected, unnecessary continuation of the high-speed following cruise control based on a detection signal from a inter-vehicle distance sensor 12 whose accuracy may have declined can be avoided.

Although the previously described embodiment is configured such that high-speed following cruise control is continued normally irregardless of whether or not a preceding vehicle is detected when the vehicle speed is in the vehicle speed overlap region and the wipers are operating in a continuous mode, the invention is not limited to such an arrangement. It is also feasible to configure the cruise control system such that when the vehicle speed is in the vehicle speed overlap region (similarly to the high speed region), the system checks if a preceding vehicle is detected and continues the high-speed following cruise control if a preceding vehicle is detected and aborts the high-speed following cruise control immediately if a preceding vehicle is not detected. In this way, added safety can be built into the system by determining whether or not to cancel the high-speed following cruise control based on the existence or absence of a preceding vehicle.

Although the previously described embodiment is configured such that cruise control is executed in the normal fashion when the wipers are operating in an intermittent mode, the invention is not limited to such an arrangement. It is also acceptable to design step S4 of FIG. 3 such that the cruise control controller 20 determines if the wipers are operating at all (i.e., in any mode, including intermittent mode) and leave the remaining steps the same. Then, when the wipers are operating, the cruise control controller 20 will determine whether or not to cancel the cruise control in the same manner as described above based on whether high-speed following cruise control is being executed, whether the vehicle speed is in the vehicle speed overlap region, and whether a preceding vehicle is detected.

Although the previously described embodiment is configured to execute either high-speed following cruise control or low-speed following cruise control depending on the speed of the vehicle, the invention is not limited to these two modes of cruise control. The invention can also be applied to a system that employs only one of these cruise control modes. In such a case, the system can be configured such that cruise control is continued when the vehicle is traveling in a comparatively low speed region in which it can be expected that there is little possibility of the system being affected by splashing and cruise control is aborted when the vehicle is traveling in a comparatively high speed region in which it can be expected that there is a high possibility of the system being affected by splashing.

The previously described embodiment is configured such that, during low-speed following cruise control, the vehicle cruise control system does not detect if a preceding vehicle exist. However, the present invention can also be applied to a cruise control system that executes cruise control causing the vehicle to travel at a preset vehicle speed in a steady state manner when it is found during low-speed following cruise control that a preceding vehicle does not exist. In such a case, the system can be configured such that even when the vehicle speed is in a low speed region, cruise control is continued when a preceding vehicle is detected and cruise control is canceled when a preceding vehicle can not longer be detected.

The previously described embodiment is configured such that the wiper operating mode information is obtained from the wiper drive control unit 30, but the invention is not limited to such an arrangement. It is also acceptable configure the cruise control system to detect an operating signal issued from a switch used to specify the wiper operating mode and determine the wiper operating mode based on the detected signal. In short, any means is acceptable so long as the wiper operating mode can be detected.

In the previously described embodiment, the corresponding programming of the cruise control controller 20 generally constitutes a cruise control section or device. The inter-vehicle distance sensor 12 and/or the corresponding programming of the cruise control controller 20 generally constitute a preceding object detecting section or device. The vehicle speed sensor 13 and/or the corresponding programming of the cruise control controller 20 generally constitute a vehicle speed detecting section or device. Step S2 of the cruise control controller 20 generally constitutes a wiper operation detecting section. Steps S2 to S12 of the cruise control controller 20 generally constitute a cruise control prohibiting section. Step S14 of FIG. 3 corresponds to the cruise control section.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle cruise control system comprising:
   a preceding object detecting section configured to detect an object existing in front of a host vehicle in equipped with the cruise control system is installed, and to detect a relative positional relationship between the object and the host vehicle;
   a cruise control section configured to control vehicle speed of the host vehicle to a target traveling state based on the relative positional relationship detected by the preceding object detecting device;
   a wiper operation detecting section configured to detect a vehicle wiper operating state of the host vehicle; and
   a cruise control prohibiting section configured to prohibit cruise control by the cruise control section depending on the vehicle wiper operating state detected by the wiper operation detecting section and the target traveling state set by the cruise control section, the cruise control prohibiting section being further configured to restrict prohibiting of the cruise control depending on the target traveling state set by the cruise control section even if the vehicle wiper operating state detected by the wiper operation detecting section indicates the cruise control needs to be prohibited.

2. A vehicle cruise control system comprising:
   a preceding object detecting section configured to detect an object existing in front of a host vehicle in equipped with the cruise control system is installed, and to detect a relative positional relationship between the object and the host vehicle;
   a cruise control section configured to control vehicle speed of the host vehicle to a target traveling state based on the relative positional relationship detected by the preceding object detecting device;
   a wiper operation detecting section configured to detect a vehicle wiper operating state of the host vehicle;
   a cruise control prohibiting section configured to prohibit cruise control by the cruise control section depending on the vehicle wiper operating state detected by the wiper operation detecting section and the target traveling state set by the cruise control section; and
   a vehicle speed detecting device configured to detect the vehicle speed of the host vehicle,
   the cruise control prohibiting section being further configured to prohibit the cruise control when the vehicle wiper operating state detected by the wiper operation detecting section indicates that the cruise control needs to be prohibited and the vehicle speed is cruise controlled such that a vehicle speed detected by the vehicle speed detecting device exceeds a preset threshold value.

3. A vehicle cruise control system comprising:
   a preceding object detecting section configured to detect an object existing in front of a host vehicle in equipped with the cruise control system is installed, and to detect a relative positional relationship between the object and the host vehicle;
   a cruise control section configured to control vehicle speed of the host vehicle to a target traveling state based on the relative positional relationship detected by the preceding object detecting device;
   a wiper operation detecting section configured to detect a vehicle wiper operating state of the host vehicle; and
   a cruise control prohibiting section configured to prohibit cruise control by the cruise control section depending on the vehicle wiper operating state detected by the wiper operation detecting section and the target traveling state set by the cruise control section,
   the cruise control prohibiting section being configured to restrict prohibiting of the cruise control when the preceding object detecting device continues to detect the object in front of the host vehicle even if the vehicle wiper operating state detected by the wiper operation detecting section indicates that the cruise control needs to be prohibited.

4. The vehicle cruise control system according to claim 3, wherein:
   the cruise control prohibiting section is further configured to prohibit cruise control when the preceding object detecting device can no longer detect the object in front of the host vehicle.

5. The A vehicle cruise control system comprising:
   a preceding object detecting section configured to detect an object existing in front of a host vehicle in equipped with the cruise control system is installed, and to detect a relative positional relationship between the object and the host vehicle;
   a cruise control section configured to control vehicle speed of the host vehicle to a target traveling state based on the relative positional relationship detected by the preceding object detecting device;

a wiper operation detecting section configured to detect a vehicle wiper operating state of the host vehicle;

a cruise control prohibiting section configured to prohibit cruise control by the cruise control section depending on the vehicle wiper operating state detected by the wiper operation detecting section and the target traveling state set by the cruise control section; and a vehicle speed detecting device configured to detect the vehicle speed of the host vehicle, the cruise control section being further configured to execute a first cruise control when the vehicle speed is in a first vehicle speed region, and to execute a second cruise control when the vehicle speed is in a second vehicle speed region that includes a range of faster vehicle speeds than the first vehicle speed region, and the cruise control prohibiting section being further configured to restrict prohibiting of the cruise control when the cruise control section is executing the first cruise control even if the vehicle wiper operating state detected by the wiper operation detecting section indicates that the cruise control needs to be prohibited.

6. The vehicle cruise control system according to claim 5, wherein:

the second vehicle speed region overlaps with an upper portion of the first vehicle speed region, the cruise control prohibiting section being further configured to prohibit the cruise control when the vehicle wiper operating state detected by the wiper operating detecting device indicates that the cruise control needs to be prohibited and the vehicle speed detected by the vehicle speed detecting device is in a vehicle speed region that exceeds the first vehicle speed region.

7. The vehicle cruise control system according to claim 6, wherein:

the cruise control prohibiting section being further configured to restrict prohibiting of the second cruise control while the preceding object detecting device continues detecting the object in front of the host vehicle when the cruise control section is executing the second cruise control even if the vehicle wiper operating state detected by the wiper operation detecting section indicates that the cruise control needs to be prohibited.

8. A vehicle cruise control system comprising:

a preceding object detecting section configured to detect an object existing in front of a host vehicle in equipped with the cruise control system is installed, and to detect a relative positional relationship between the object and the host vehicle;

a cruise control section configured to control vehicle speed of the host vehicle to a target traveling state based on the relative positional relationship detected by the preceding object detecting device;

a wiper operation detecting section configured to detect a vehicle wiper operating state of the host vehicle;

a cruise control prohibiting section configured to prohibit cruise control by the cruise control section depending on the vehicle wiper operating state detected by the wiper operation detecting section and the target traveling state set by the cruise control section; and a vehicle speed detecting device configured to detect the vehicle speed of the host vehicle, the cruise control section being further configured to execute a first cruise control when the vehicle speed is in a first vehicle speed region, and to execute a second cruise control when the vehicle speed is in a second vehicle speed region that includes a range of faster vehicle speeds than the first vehicle speed region, the cruise control prohibiting section being further configured to restrict prohibiting of the cruise control while the preceding object detecting device continues detecting the object in front of the host vehicle when the cruise control section is executing the second cruise control even if the vehicle wiper operating state detected by the wiper operation detecting section indicates that the cruise control needs to be prohibited.

9. The vehicle cruise control system according to claim 8, wherein:

the cruise control prohibiting section is further configured to prohibit the cruise control when the preceding object detecting device can no longer detect the object in front of the host vehicle.

10. A vehicle cruise control system comprising:

preceding object detecting means for detecting an object existing in front of a host vehicle and a relative positional relationship between the object and the host vehicle;

cruise control means for controlling vehicle speed of the host vehicle to a target traveling state based on the relative positional relationship;

wiper operation detecting means for detecting a vehicle wiper operating state of the host vehicle;

cruise control prohibiting means for prohibiting cruise control depending on the vehicle wiper operating state and the target traveling state; and cruise control prohibition restricting means for restricting prohibiting of the cruise control depending on the target traveling state even if the vehicle wiper operating state indicates the cruise control needs to be prohibited.

11. A method of controlling a vehicle cruise state comprising:

detecting an object existing in front of a host vehicle and also a relative positional relationship between the object and the host vehicle;

controlling vehicle speed of the host vehicle such that the vehicle travels in a target traveling state based on the relative positional relationship detected;

detecting an operation state of vehicle wipers of the host vehicle; and selectively prohibiting the controlling of the vehicle speed of the host vehicle to the target traveling state depending on a vehicle wiper operating state and a detected traveling control stay;

restricting prohibiting of the controlling of the vehicle speed of the host vehicle to the target traveling state depending on the detected target traveling state even if the vehicle wiper operating state indicates the controlling of the vehicle speed of the host vehicle to the target traveling state needs to be prohibited.

* * * * *